United States Patent [19]

Fong et al.

[11] Patent Number: 5,308,498
[45] Date of Patent: May 3, 1994

[54] HYDROXAMIC ACID CONTAINING POLYMERS USED AS CORROSION INHIBITORS

[75] Inventors: Dodd W. Fong; Binaifer S. Khambatta, both of Naperville, Ill.

[73] Assignee: Nalco Chemical Company, Naperville, Ill.

[21] Appl. No.: 44,859

[22] Filed: Apr. 8, 1993

Related U.S. Application Data

[63] Continuation-in-part of Ser. No. 734,847, Jul. 24, 1991, abandoned.

[51] Int. Cl.$^5$ .................................... C02F 5/14
[52] U.S. Cl. ................... 210/697; 210/700; 210/701; 252/180; 252/181; 252/392; 422/15; 422/16; 422/17
[58] Field of Search .................... 210/696–701; 252/180, 181, 390, 392, 394, 396; 422/13, 14, 15, 16, 17

[56] References Cited

U.S. PATENT DOCUMENTS

| | | | |
|---|---|---|---|
| 2,959,574 | 11/1960 | Woodberry | 260/85.5 |
| 4,092,244 | 5/1978 | Suen et al. | 210/699 |
| 4,480,067 | 10/1984 | Vio et al. | 210/701 |
| 4,532,046 | 7/1985 | Meunier et al. | 210/698 |
| 4,536,296 | 8/1985 | Vio | 525/377 |
| 4,767,540 | 8/1988 | Spitzer et al. | 210/728 |
| 4,810,296 | 3/1989 | Guerro et al. | 106/315 |
| 4,868,248 | 9/1989 | Sparapany et al. | 525/380 |
| 4,919,821 | 4/1990 | Fong et al. | 210/701 |
| 4,929,425 | 5/1990 | Hoots et al. | 210/701 |

OTHER PUBLICATIONS

Journal of Polymer Science: Part A: Polymer Chemistry, vol. 26, 2623–2630 (1988) "The Synthesis of Poly(-hydroxamic acid) from Poly(acrylamide)" by A. J. Domb.

*Primary Examiner*—Peter A. Hruskoci
*Attorney, Agent, or Firm*—Robert A. Miller; James J. Drake; Joseph B. Barrett

[57] ABSTRACT

A method of inhibiting corrosion of iron and steel alloys in contact with industrial waters is claimed. The method comprises treating said waters with an effective corrosion inhibiting amount of a water soluble polymer having an average molecular weight ranging from about 2,000 to about 50,000, said polymer containing at least four mole percent of a hydroxamic acid mer unit.

11 Claims, No Drawings

HYDROXAMIC ACID CONTAINING POLYMERS USED AS CORROSION INHIBITORS

BACKGROUND OF THE INVENTION

1. Reference to Related Patent

This is a continuation-in-part application of copending U.S. patent application Ser. No. 07/734,847, filed Jul. 24, 1991, now abandoned.

2. Field of the Invention

The invention relates to a method of inhibiting corrosion and, more particularly, to a corrosion inhibition method for use in industrial waters.

3. Description of the Prior Art

The inhibition of corrosion in iron and steel alloys which came in contact with industrial waters is critical. Corrosion difficulties result in immense maintenance, as well as costs failure of incurred as a result of alloyed materials in contact with corrosive elements present in industrial waters is not inhibited or prohibited.

Prior art methods for treating waters in contact with iron alloys and steels disclose a wide range of treatment options. Waters have been treated with inorganic components, such as chromate salts, but chromates have been found to be injurious to the environment, and these treatments have fallen out of favor. Waters have also been treated with inorganic or organic phosphates and phosphonates to inhibit corrosion. These materials are often expensive and must be formulated with other ingredients to provide optimal results.

The use of organic polymers, particularly relatively low molecular weight polymers, has been explored for inhibiting scale corrosion of iron and steel alloys in contact with industrial waters where the polymers are primarily used as anti-scalants, prohibiting scale formation of hardness constituents in the waters. Such hardness scales include calcium carbonate, hydroxyapatite, calcium hydroxide, magnesium carbonates, magnesium phosphates, magnesium hydroxides and mixed magnesium and calcium scales. When the surface of the iron or steel is scaled, enhanced corrosion occurs under the formed scale. Polymeric treatment of the waters prohibit or inhibit scale formation and, therefore, provide some relief in terms of enhanced corrosion rates at or below the surface of the scale.

Some low molecular weight polymers have been found to be corrosion inhibitors in and of themselves, either in the presence or absence of hardness in the water. These corrosion inhibiting polymers have been primarily carboxylate containing polymers of relatively low molecular weight, and are often synthesized with monomers that are oleophilic in nature, such monomers including methyl and ethylacrylate.

Although polymers which are useful as anti-scalants for hardness scales are also sometimes corrosion inhibitors, not all anti-scalant polymeric substances are necessarily corrosion inhibitors. Materials which are anti-scalants can, in fact, induce a higher rate of corrosion. This is particularly true in the absence of hardness species, such as calcium and magnesium.

Polymers containing hydroxamic acid functional groups are well known in the art. A. J. Domb, in an article entitled "The Synthesis of Poly(hydroxamic Acid) from Poly(acrylamide), *Journal of Polymer Science: Part A: Polymer Chemistry*, Vol. 26, 2623–2630 (1988), taught the synthesis of polyhydroxamic acids in either gel or water soluble forms by reacting polyacrylamides with hydroxylamine and basic aqueous solutions at room temperature. Domb's polymers contained 70 percent hydroxamic acid groups, less than 5 percent carboxylic acid groups, and 25 percent unreacted amide groups. These polymers exhibited high affinity for ferric ion and for cupric ion in a pH range of from 1 to 5 with an extremely high complexing or binding rate.

Materials which exhibit very high complexing capabilities often enhance corrosion rates. For example, ethylenediamine tetracetic acid (EDTA), when added to industrial waters at high concentrations, has been demonstrated to enhance the rate of corrosion of iron and steel alloys in contact with the industrial waters.

The Domb article emphasizes the use of polyhydroxamic acid polymers in terms of biopolymer research, because of the polymers' anticoagulant and urease inhibitory activity. The article suggests the use of polyhydroxamic acid polymers as ion exchange resins but did not suggest any use of them as anti-corrosion treatments.

Various amide and/or carboxylate polymers obtained by a reaction with hydroxylamine have also been taught. U.S. Pat. No. 2,959,574, issued to Woodbury, reacts copolymers of acrylonitrile and acrylamide with hydroxylamine to form copolymeric amidoxime compositions, which are taught to be useful as sedimentation or flocculating agents, for ore and industrial waste treatment, in mineral treatment, as coating compositions in film forming for producing wrapping materials, as thickeners, as protective colloids, in adhesive formulations and as drilling mud additives. There is no teaching of the use of Woodbury's materials to inhibit corrosion of iron and steel alloys in contact with industrial waters.

U.S. Pat. No. 4,532,046, issued to Meunier, et. al., teaches a method to eliminate scaling of alkaline earth compounds from aqueous media by adding a treatment agent comprised of a water soluble hydroxamic acid containing polymer. There is no teaching in Meunier in regard to corrosion inhibition of iron or steels in contact with industrial waters. Meunier emphasizes the use of his polymers in sea waters as an anti-scaling agent to prevent precipitation of alkaline earth salts or to limit the increase and the size of crystals of alkaline earth precipitating salts, thereby inhibiting scale formation on surfaces in contact with sea waters.

U.S. Pat. No. 4,767,540, issued to Spitzer, et.al. teaches the use of hydroxamic acid containing polymers to reduce suspended solids in Bayer processing streams. The Bayer process treats raw bauxite ores and recovers therefrom aluminum trihydrate which is later treated to recover aluminum and to make alumina products. The Bayer process runs at very high caustic and dissolved solid levels and requires settling and filtration to remove iron oxides and other contaminants. There is nothing in the Spitzer teachings related to corrosion control.

U.S. Pat. No. 4,536,296, issued to Vio, teaches the use of clay based water drilling or completion muds, which muds are formulated with low molecular weight polymers or copolymers containing hydroxamic acids or thiohydroxamic acid groups. This patent teaches the use of polymeric compositions to form extremely stable complexes with transition metals, thereby contributing to dispersacy in drilling muds. The polymers are taught to be effectively absorbed on particles of clay through the aluminum, calcium, magnesium, iron and other cations present in the clay providing significant plugging or fluid loss effect when used as "dispersion additives". Again, no teaching is contained in this patent relative to the use of these type of hydroxamic acid polymers as corrosion inhibitors in industrial waters.

SUMMARY OF THE INVENTION

A method of inhibiting corrosion of iron and steel alloys in contact with industrial waters is claimed. The method comprises treating said waters with an effective corrosion inhibiting amount of a water soluble polymer having an average molecular weight ranging from about 2,000 to about 50,000, said polymer containing at least four mole percent of a hydroxamic acid mer unit having the structure:

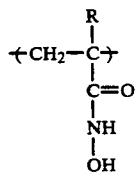

wherein R is selected from the group consisting of hydrogen, methyl, and mixtures thereof.

Combination Treatment

When inhibiting corrosion of mild steels and iron in contact with industrial waters containing hardness ions, it is preferred to add to the hydroxamic acid polymer treatments a scale inhibiting or dispersant polymer, which polymer does not contain hydroxamic acid functional groups. These polymers are primarily water soluble polymers having a molecular weight between 1,000 and 50,000 and containing carboxylate functionality, said polymers again being free of hydroxamic acid functional groups, and said carboxylate functionality obtained from repeating mer units, often randomly distributed, having the structure:

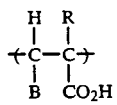

wherein R is hydrogen, methyl, or mixtures thereof and B is hydrogen, —CO$_2$H, —CH$_2$CO$_2$H, or mixtures thereof. The polymers also contain from 0 to 50 mole percent of at least one of the monomers chosen from the group consisting of acrylamide, methacrylamide, hydroxypropylacrylates, hydroxyethylacrylates, N-tertiary-butyl-acrylamide, N-sulfomethylacrylamide, N-sulfoethylacrylamide, AMPS, sulfonated styrene, vinyl sulfonates, itaconic acids, and the like. These scale inhibiting/dispersant polymers are exemplified primarily by polymers that contain acrylic acid or methacrylic acid or both. These acrylic acid or methacrylic acid polymers may be homopolymers,copolymers, or terpolymers, but it is preferred that the polymer contains either acrylic acid, methacrylic acid, maleic anhydride, itaconic acid, or some carboxylate containing monomer unit monomer unit or combination of monomer units comprising at least 50 percent of the molar ratios of total monomer used in the synthesis of these polymers.

The scale inhibiting and/or dispersing polymer, when used in combination with our hydroxamic acid containing polymers, are preferably used within the weight ratio ranging between about 10 to 1 to about 1 to 10, preferably from about 5 to 1 to about 1 to 5. of scale inhibitor/dispersant polymer to hydroxamic acid polymer. When the combination of polymers is used, the combination is normally added to the water such that the addition of the combination will provide from 1 to 200 parts per million of the hydroxamic acid containing polymer, based on the weight of the waters being treated.

The most preferred scale inhibiting/dispersant polymers are homopolymers of acrylic acid, methacrylic acid, or maleic anhydride and copolymers containing either acrylic acid, or methacrylic acid, or both, which copolymers also contain at least one of the monomers chosen from the group consisting of acrylamide, methacrylamide, maleic anhydride, hydroxypropylacrylates, hydroxyethylacrylate, N-tertiary-butyl-acrylamide, 2-acrylamido-2-methylpropanesulfonate, sulfomethylacrylamide, sulfoethylacrylamide, sulfonated styrene, vinyl sulfonate, itaconic acid, and N-hydroxypropylacrylamide. These polymers normally contain at least 40 mole percent of acrylic acid, methacrylic acid, or mixtures thereof with the remainder of the polymer containing at least one of the monomer units (or mer units) mentioned above.

Other monomers may also be used with these polymers including acrylonitrile, methyl acrylate, ethyl acrylate, and the like. Since these monomers are primarily hydrophobic and not hydrophilic, the content of the hydrophobic monomer normally is limited to less than 10 mole percent, and preferably less than 5 mole percent in these polymers.

The water soluble dispersing and/or scale inhibiting polymers have a molecular weight ranging from 1,000 to 50,000, preferably from 2,500 to about 35,000, and most preferably to about 3,000 to about 25,000.

When the scale inhibiting/dispersant polymers are used, they may be used with the hydroxamic polymers either singly, or as combinations of one or more of the scale inhibiting/dispersant polymers. The combinations may include any of the polymers derivable from the definitions above but are preferably used in combinations containing homopolymers of acrylic acid, homopolymers of methacrylic acid, copolymers of acrylic acid with at least one monomer selected from the group consisting essentially of methacrylic acid, acrylamide, methacrylamide, the hydroxypropylacrylates, N-t-butylacrylamide, 2-methylpropane sulfonic acid, sulfomethylacrylamide, sulfoethylacrylamide, and itaconic acid; and copolymers of maleic anhydride with at least one of the monomers chosen from the group consisting of acrylic acid, methacrylic acid, vinyl sulfonate, styrene sulfonate, itaconic acid, and the like.

Hydroxypropylacrylates, refers to any structure obtained by the reaction of acrylic acid with propylene oxide leading to ester groups having the formulas:

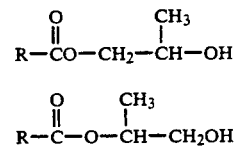

or mixtures thereof.

When used in combination with scale inhibiting/dispersing polymers, the hydroxamic acid containing polymer, the scale inhibiting/dispersing polymer is preferably the terpolymer described above, which terpolymer has the structure:

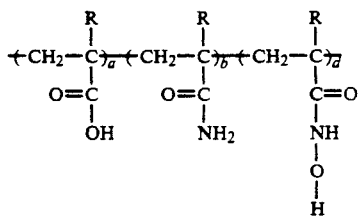

Wherein R is chosen from the group consisting of hydrogen, methyl, or mixtures thereof and the following relationships exist:

1) the sum, (a+b+d), is sufficient to provide for a molecular weight ranging from 2,000–50,000;
2) the ratio, a/(a+b+d), ranges from 0.99 to 0.40;
3) the ratio, b/(a+b+d), ranges from 0.30 to 0.0;
4) the ratio, d/(a+b+d), ranges from 0.01 to 0.30;

As before, the acidic mer units, containing carboxylic acids, or hydroxamic acids, or both, may be present as their salts, or mixtures thereof.

When these mixtures are used, the scale inhibiting/dispersing polymers, and the hydroxamic acid containing polymers, are used within the weight ratio ranging from 10:1 to 1:10, preferably 5:1 to 1:5. As before when the combination is used, the combination is preferably added to "hard" waters containing hardness ions, such as calcium, magnesium, and the like so as to provide from about 1 to about 50 parts per million of the hydroxamic acid polymers in the hard waters, based upon the weight of the hard waters treated.

DESCRIPTION OF THE PREFERRED EMBODIMENT

Preferably, the polymer has a molecular weight ranging from about 2,500 to about 25,000 and contains from about 4.0 to about 30 mole percent of the above described hydroxamic acid mer unit.

It is most preferred that the aqueous system be treated with polymers having a molecular weight in a range of about 5,000 to about 15,000 and that the polymer contains anywhere from about 4.0 to about 14 mole percent of the hydroxamic acid mer unit.

The hydroxamic acid mer unit may also include the presence of any of its water soluble salts, for example, alkali metal salts, alkaline earth metal salts, ammonium salts, protonated amine salts, or quaternary amine salts.

The most effective corrosion inhibiting amount of the polymers used to treat the waters in contact with the iron and steel ranges between about 1 to about 200 parts per million polymer, based on the weight of the waters treated, preferably between about 2 and 100 parts per million polymer, based on the weight of waters treated, and most preferably ranging between about 5 and about 50 parts per million polymer, based on the weight of the waters treated.

The most preferred polymers are copolymers or terpolymers which contain at least one mole percent hydroxamic acid mer unit, preferably from 1–30 mole percent hydroxamic acid mer unit, wherein the polymer also contains monomers or repeating mer units derived from monomers, such as acrylic acid, methacrylic acid, acrylamide, methacrylamide, sulfonated monomers, such as 2-acrylamido-2-methylpropanesulfonate, N-sulfomethylacrylamide, N-sulfoethylacrylamide, sulfonated styrenes, vinyl sulfonates, maleic anhydrides, itaconic acids, hydroxypropylacrylates, hydroxyethylacrylate, N-t-butylacrylamide, and the like.

The most preferred polymers containing hydroxamic acid mer units are the polymers that have the structure:

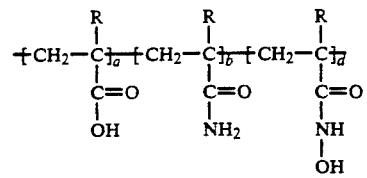

wherein R is chosen at each occurrence from hydrogen, methyl, and mixtures thereof, and a, b, d have the following relationships:

1) The sum of a+b+d is sufficient to provide a molecular weight between about 2,000 to about 35,000;
2) The ratio, d/(a+b+d) ranges from about 0.30 to about 0.01;
3) The ratio, b/(a+b+d) ranges from about 0.3 to about 0.0;
4) The ratio, a/(a+b+d) ranges from about 0.99 to about 0.40

Most preferably, the hydroxamic acid polymers above are those polymers wherein R is hydrogen and a, b, and d have the following relationships:

1) The sum (a+b+d) is sufficient to provide a molecular weight ranging from 2500 to 25,000;
2) The ratio, d/(a+b+d), ranges from about 0.14 to about 0.02;
3) The ratio, b/(a+b+d), ranges from about 0.30 to about 0.01;
4) The ratio, a/(a+b+d), ranges from about 0.97 to about 0.56;

and further wherein the polymer is used at from 1 to 100 ppm polymer, based on the weight of the water being treated.

The most preferred polymers are polymers which contain acrylic acid or methacrylic acid, and optionally contain acrylamide or methacrylamide, along with the repeating mer unit containing the hydroxamic acid functional group.

Other Corrosion Inhibitors

In addition to the use of the hydroxamic acid polymers of the invention to inhibit corrosion, it is anticipated that these polymers may be used also in combination with known corrosion inhibitors for iron and steel in contact with industrial waters. These inhibitors include ortho-phosphates, organophosphates, phosphonates, polyolphosphate esters, and mixtures thereof. They can also include zinc ions, inorganic chromates, and other species shown to protect iron and steel alloys from corrosion when these iron and steel materials are exposed to industrial waters.

When other corrosion inhibitors are used, it is preferred to use orthophosphate or orthophosphate sources, organophosphonates, such as 1,2,4-tri-carboxy-2-phosphono-butane (often referred to as PBTC) and HEDP, (1-Hydroxyethylidene) bis-phosphonic acid or the so called Dequest® product. ≠Dequest ® is a registered trademark of Monsanto The hydroxamic acid polymers of this invention may, in fact, be substituted partially or completely for the normal organophosphonate corrosion inhibitors known in the art. When completely substituted for the organophosphonate, the hydroxamic acid polymers of this invention can be as effective in inhibiting corrosion as the organophosphonates. When partially substituted for the organophosphonates, the formulation containing a mixture of the organophosphonates with the hydroxamic acid polymers of this invention, particularly when in the presence of the scale inhibiting dispersant polymers, provides not only superior corrosion protection, but also excellent scale protection.

It is well known that hardness scale inhibitors are not necessarily corrosion inhibitors. As shown in Table I, a comparison of the corrosion rates of several well known hardness scale inhibitors shows that even the inhibitor with the lowest corrosion rate, i.e. polymer 2, the acrylic acids/styrene/sulfate/AMPS combination shows a corrosion rate of 7.71 mpy. Such a corrosion rate is much higher than any of the corrosion rates disclosed in the instant application. Specifically, the preferred polymer combination in the instant application has a very low corrosion rate of 0.86 mpy, or almost 1/10 of the corrosion rate of the hardness scale inhibitors with the lowest corrosion rate.

TABLE I

Electrochemical Corrosion Test Results on Various Scale Inhibitors

Water Chemistry/Conditions:
360 ppm Ca/200 ppm Mg/440 $HCO_3$ (all as $CACO_3$)
Temperature: 120 F., pH: uncontrolled, air agitation,
Prepolished Mild Steel Specimen, 30 minute delay time, 500 rpm
Standard deviation of corrosion rate: ±0.345 mpy 15 ppm inhibitor (as actives)

| Polymer | Description | Corrosion Rate (mpy) |
|---|---|---|
| Blank | no inhibitor | 31.05 mpy |
| 1 | acrylic acid/methacrylic acid/t-butyl acrylamide: | 10.65 mpy |
| 2 | acrylic acid/styrene sulfonate/AMPS(*): | 7.71 mpy |
| 3 | acrylic acid/sulfomethyl acrylamide/acrylamide: | 8.63 mpy |
| 4 | hydrolyzed maleic anhydride/sulfonated styrene copolymer: | 40.7 mpy |
| Claimed Polymer | 10 mole % hydroxamic acid modified acrylic acid polymer: | 0.86 mpy |

(*AMPS: acrylamido-2-methylpropane sulfonic acid)
(mpy: mils per year)
(rpm: rotation per minute)

Experiments

Several tests were performed to measure the effectiveness of combining hydroxamic acid polymers with other compounds in corrosion inhibition. These tests are summarized as follows:

Saturation Ratio Test

A test solution is prepared by adding calcium, magnesium, inhibitor test polymer and bicarbonate to deionized water. Initial concentrations of the salts should be: 360 ppm $Ca^{+2}$, 200 ppm $Mg^{+2}$, 500 ppm $HCO_3$— (all as $CaCO_3$) and 5, 10, or 15 ppm of inhibitor test polymer as polymer actives/solids. The temperature is maintained at 140° F. (60° C.); the solution is stirred at all times, and the pH is continuously monitored. The solution is titrated with dilute NaOH at a constant rate. With the addition of NaOH, the pH of the test solution slowly increases, then decreases slightly, and increased again. The maximum pH, prior to the slight decrease at precipitation, is the breakpoint pH. A mineral solubility computer program is then used to calculate the calcium carbonate supersaturation ratio based on test conditions at the breakpoint pH. This supersaturation ratio is related to the calcium carbonate inhibition performance. The test procedure is repeated for different inhibitor solutions and dosages. All precipitated calcium carbonate must be removed from the test apparatus with dilute HCl prior to the next test run.

Calcium Carbonate Inhibition Test

Calcium, magnesium, test polymer inhibitor and bicarbonate is added to deionized water to prepare a test solution with 360 ppm $Ca^{+2}$, 200 ppm $Mg^{+2}$, 500 ppm $HCO_3$—(all as $CaCO_3$) and 5, 10 or 15 ppm inhibitor as actives/solids. initial sample of the test water is collected for calcium analysis by atomic absorption. The test temperature is maintained at 140° F. (60° C.). Using dilute NaOH, the pH of the solution is slowly increased to 9.0, and maintained during the two hour duration of the test. At the conclusion of the test, a small sample of the solution is filtered (0.45 um) and the calcium concentration is determined by atomic absorption. The remainder of the unfiltered sample is allowed to settle, undisturbed for 24 hours, at room temperature. Water is then collected from the top of the flask after 24 hours and analyzed for calcium. The % inhibition and % dispersancy are calculated in the following manner:

$$\% \text{ inhibition} = \frac{\text{ppm } Ca^{+2} \text{ filtered}}{\text{ppm } Ca^{+2} \text{ initial}} \times 100$$

$$\% \text{ dispersancy} = \frac{\text{ppm } Ca^{+2} \text{ unfiltered, settled}}{\text{ppm } Ca^{+2} \text{ initial}} \times 100$$

Electrochemical Test

Both the Tafel plots and linear polarization resistance tests are conducted in the same water chemistry and conditions. The test solution for the electrochemical corrosion cell is prepared by adding calcium, magnesium, various inhibitors, and bicarbonate to deionized water to obtain 360 ppm $Ca^{+2}$, 200 ppm $Mg^{+2}$, 440 ppm $HCO_3$ (all as $CaCO_3$).

Temperature is maintained at 120° F. and the solution is aerated throughout the test period. The pH is uncontrolled. A standard three electrode cell is assembled for the polarization studies. Pre-polished mild steel specimens were used as the rotating working electrode, at a speed of 500 rpm. All potential measurements are made against a saturated calomel reference electrode. Two graphite rods are used as the counter electrode. Polarization resistance measurements are conducted within ±20 mV of the corrosion potential at a scan rate of 0.1 mV/sec. Tafel plots are performed by polarizing the mild steel specimen at 250 mV cathodically and anodically from the corrosion potential.

The Saturation Ratio calculation is described in a paper entitled, "Computerized Water Modeling in the Design and Operation of Industrial Cooling Systems" presented at the 41st Annual Meeting at the International Water Conference in Pittsburgh, Penn., Oct. 20–22, 1980. This paper is incorporated herein by reference.

The Saturation Ratio test is dependent on the formation of scale above a certain critical pH. Consequently, sodium hydroxide is added to the test solution to increase the pH and supersaturate the test water until the breakpoint pH is achieved. Nucleation and crystal growth occur during test period. The breakpoint pH is used in a computer program described in the paper above to calculate the saturation ratio values. This value is simply an index for predicting the tendency toward calcium carbonate precipitation. The computer program calculates the saturation ratio based on water composition, operating conditions, temperature, breakpoint pH, cycles of concentration, and acid pH control. The program also compensates for temperature, ionic strength and ion pairing effects. The greater the saturation ratio, the better the polymer is as a scale inhibitor.

The calcium carbonate inhibition test is often referred to as the "Stir and Settle Test". This test provides information such as percent inhibition and dispersancy for a particular scale control agent. Inhibition describes the ability to limit the formation of scaling salts such as calcium carbonate by preventing calcium carbonate growth. Dispersancy characterizes the ability of a chemical to prevent the settling of particulates over extended time periods. Performance is determined by measurement of the atomic absorption of calcium, and the higher the percent inhibition and percent dispersancy, the better the polymer is as a scale inhibitor.

The electrochemical test provide for measurement of Tafel plots and linear polarization resistance data to measure corrosion inhibition activity. This activity is reported as a corrosion rate, and the lower corrosion rate, the better the polymer is as corrosion inhibitor.

Representative of the polymers of this invention are the polymers described in Table II.

TABLE II

| Polymer | Composition (mole %) | **Estimated Molecular Weight |
|---|---|---|
| 1 | 94 mole % acrylic acid 6 mole % (CH$_2$—CH) 0 = C NHOH | 6,000–7,000 |
| 2 | 90 mole % acrylic acid 10 mole % (CH$_2$—CH) 0 = C NHOH | 6,000–7,000 |
| ***3 | 100% acrylic acid (Backbone polymer) | 6,000–7,000 |
| 4 | 89% acrylic acid 5% acrylamide 6% hydroxamic mer unit* | 12,000–13,000 |
| 5 | 70% acrylic acid 19% acrylamide 11% hydroxamic mer unit | 12,500–13,500 |
| 6 | 53% acrylic acid 18% acrylamide 29% hydroxamic mer unit | 12,700–13,700 |
| 7 | 83% acrylic acid 9% acrylamide 8% hydroxamic mer unit | 12,500–13,500 |
| ***8 | 50–60% acrylic acid 14–20% sulfomethyl-acrylamide 20–36% acrylamide | 18,000–19,000 |
| ***9 | 55–65% acrylic acid 15–25% methacrylic acid 10–30% N-t-butylacrylamide | 15,000–16,000 |
| ***10 | Polyacrylic acid homopolymer neutralized with sodium hydroxide | 4,000–7,500 |
| ***11 | Copolymer of acrylic acid and the isopropyl ester of acrylic acid (ester content from 6–10 mole %) | 4,000–7,500 |

TABLE II-continued

| Polymer | Composition (mole %) | **Estimated Molecular Weight |
|---|---|---|

Other Abbreviations
PBTC - 1,2,4-tri-carboxy-2-phosphono-butane
HEDP - (1-Hydroxyethylidene) bis-phosphonic acid
*Hydroxamic mer unit = $-\!(CH_2\!-\!CH)\!-$
                                    |
                               O=C NHOH
**Molecular weight is estimated weight average molecular weight as determined by gel permeation chromatography using polystyrene sulfonate standards
***Polymers 3, 8, 9, 10, and 11 are representative of "scale inhibiting/dispersing polymers"

Using the listed polymers, various tests were performed to determine saturation ratios, percent inhibition, and percent dispersancy in the so called "Stir and Settle" tests, and electrochemical screening tests for corrosion inhibition and determination of corrosion rates. The water chemistry and test conditions, as well as the results are presented in the following Tables III, IV and V.

TABLE III

Saturation Ratio Test

Water Chemistry/Conditions:
360 ppm Ca/200 ppm Mg/500 ppm HCO$_3$ (as CaCO$_3$)
Temperature: 60° C., Stir rate: 300 rpm
Titrant: 0.10 Normal NaOH
Dosage: 5, 10 and 15 ppm actives
Standard Deviation of Saturation Ratio: ±6.6
Saturation ratio of blank: 3.0

| Polymer | Saturation Ratio | | |
|---|---|---|---|
| | 5 ppm | 10 ppm | 15ppm |
| 1 | 40.9 | 128.9 | 130.7 |
| 2 | 43.4 | 97.1 | 124.7 |
| 3 | 97.1 | 125.9 | 131.9 |
| 4 | 46.4 | 112.3 | 127.9 |
| 5 | 62.3 | 106.0 | 127.9 |
| 6 | 36.8 | 53.9 | 76.9 |
| 7 | 62.3 | 106.0 | 118.6 |

TABLE IV

Stir and Settle Test

Water Chemistry/Conditions:
360 ppm Ca/200 ppm Mg/500 HCO$_3$ (as CaCO$_3$)
Temperature: 60° C., Stir Rate: 250 rpm
Titrant: 0.10 Normal NaOH, pH: 9.0 for two hours
Blank: 0.6% inhibition, 1.3% dispersancy

| Polymer | Saturation Ratio | | |
|---|---|---|---|
| | 5 ppm | 10 ppm | 15ppm |
| 1 % inhibition: | 39.6% | 53.1% | 61.4% |
| % dispersancy: | 40.2% | 59.3% | 75.8% |

TABLE V

Electrochemical Screening Test for Mild Steel Corrosion Inhibition of Several Hydroxamic Acid Containing Polymers Water Chemistry/Conditions:
360 ppm Ca/200 ppm Mg/440 HCO3 (as CaCO3)
Temperature: 120° F., pH: uncontrolled, air agitation,
Unpolished Mild Steel specimen, 30 minute delay time, 500 rpm
Standard deviation of corrosion rate: ±0.345 mpy
Polymer Combination:
(A). 20 ppm inhibitor, 0 ppm PBTC, 15 ppm Polymer 8
(B). 10 ppm inhibitor, 10 ppm PBTC, 15 ppm Polymer 8
(C). 10 ppm inhibitor, 10 ppm PBTC, 15 ppm Polymer 9

| Polymer | Corrosion Rate (mpy) | | |
|---|---|---|---|
| Inhibitor | (A) | (B) | (C) |
| 1 | .18 | 3.96 | 1.53 |

TABLE V-continued

Electrochemical Screening Test for Mild Steel Corrosion
Inhibition of Several Hydroxamic Acid Containing Polymers

| | | | |
|---|---|---|---|
| 2 | 1.84 | 1.39 | 0.95 |
| 4 | 0.38 | .84 | 1.98 |
| 5 | .50 | .34 | 1.81 |
| 6 | 3.13 | .88 | .79 |
| 7 | 2.24 | .76 | 1.04 |
| Blank* | 8.63 | .98 | 1.92 |

Other Combinations:
20 ppm Polymer 2, 10 ppm PBTC, 10 ppm Polymer 8: 0.75 mpy
15 ppm Polymer 2, 5 ppm PBTC, 15 ppm Polymer 8: 1.39 mpy
20 ppm Polymer 5, 0 ppm PBTC, 15 ppm Polymer 10:
0.57 mpy (avg)
20 ppm Polymer 5, 0 ppm PBTC, 15 ppm Polymer 11: 1.03 mpy
Other Combinations:
10 ppm Polymer 5, 10 ppm Polymer 11, 15 ppm Polymer 8:
0.34 mpy
10 ppm Polymer 5, 10 ppm Polymer 10, 15 ppm Polymer 8:
0.73 mpy
10 ppm Polymer 5: 6.0 mpy
20 ppm Polymer 5: 1.75 mpy
15 ppm Polymer 11: 1.27 mpy
15 ppm Polymer 10: 2.71 mpy (avg)
Blank**: no inhibitor: 31.05 mpy

*Contains no hydroxamic acid polymer, but contains other treatments as listed
**Contains no treatment The test results above show clearly that the hydroxamic polymers of this invention can be used to inhibit corrosion of steels in contact with industrial waters, either alone or particularly in combination with hardness reactive polymers, such as the carboxylate containing polymers described above. Also, the hydroxamic acid polymers by themselves or in combination with hardness reacting polymers inhibit corrosion of iron and steel in contact with industrial waters when present in those industrial waters, either with or without other known corrosion inhibitors.

Also as can be seen from the results in Table IV, the hydroxamic acid polymers can substitute for organophosphonates when used in combination with phosphonates or when used alone in the absence of these organophosphonate corrosion inhibitors.

Having described our invention, we claim:

1. A method of inhibiting corrosion of iron and steel alloys in contact with industrial waters containing hardness ions the method comprising the step of:
   adding to said waters a corrosion inhibiting amount of water soluble polymer having from about 4.0 to about 30 mole percent of hydroxamic acid mer unit having the structure:

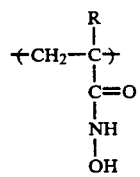

wherein R is selected from the group consisting of H, CH$_3$ and mixtures thereof, and from about 40 to about 96 mole percent acrylic acid mer unit, and wherein the polymer has a molecular weight ranging from about 2000 to about 50,000.

2. The method of claim 1 wherein the polymer has a molecular weight of from about 5,000 to about 25,000 and contains from about 4.0 to about 14 mole percent of the hydroxamic acid mer unit.

3. The method of claim 1 wherein the amount of polymer added to the aqueous system ranges between about 1 and 200 parts per million of polymer, based on the weight of waters treated.

4. The method of claim 1 wherein the polymer has the structure:

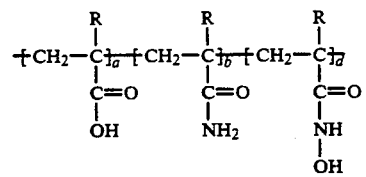

wherein R is selected from the group consisting of H, CH$_3$ and mixtures thereof; and wherein a, b and d have the following relationships:
  1) The sum of a+b+d is sufficient to provide a molecular weight between about 2,000 to about 35,000;
  2) The ratio, d/(a+b+d) ranges from about 0.30 to about 0.04;
  3) The ratio, b/(a+b+d) ranges from about 0.3 to about 0.0; and
  4) The ratio, a/(a+b+d) ranges from about 0.96 to about 0.40

5. The method of claim 4 wherein R is hydrogen and a, b and d have the following relationships:
  1) The sum (a+b+d) is sufficient to provide a molecular weight ranging from 2500 to 15,000;
  2) The ratio, d/(a+b+d), ranges from about 0.14 to about 0.04;
  3) The ratio, b/(a+b+d), ranges from about 0.30 to about 0.01;
  4) The ratio, a/(a+b+d), ranges from about 0.94 to about 0.56;

and further wherein the polymer is used at from 2 to 100 ppm polymer, based on the weight of the water being treated.

6. A method of inhibiting corrosion of iron and steel alloys in contact with industrial waters containing hardness ions, which method comprises the step of treating said hardness ion containing waters with a combination of the following polymers:
  a. water soluble scale inhibiting polymers having a molecular weight between 1,000–50,000 and containing carboxylate functionality, the polymers being free of hydroxamic acid functional groups, the polymers being comprised of mer units having the structure:

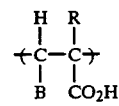

wherein
  R is H, CH$_3$, or mixtures thereof;
  B is H, —CO$_2$H, —CH$_2$CO$_2$H or mixtures thereof; and
  b. a water soluble polymer having a molecular weight between 2,000–50,000 and containing from about 4.0 to about 30 mole percent of a hydroxamic acid mer unit having the structure:

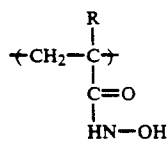

wherein R is chosen from the group H, CH$_3$, and mixtures thereof, and from about 40 to about 96 mole percent acrylic acid mer unit; and wherein the weight ratio of the two polymers is between about 10:1 to about 1:10.

7. The method of claim 6 wherein the water soluble polymers having a molecular weight between 1,000–50,000 and containing carboxylate functionality further comprise from 0 to 50 mole percent of a monomer selected from the group consisting of acrylamide, methylacrylamide, 2-acrylamido-2-methylpropane sulfonic acid, hydroxypropylacrylates, hydroxyethyl acrylate, N-t-butylacrylamide, N-sulfomethylacrylamide, N-sulfoethylacrylamide, sulfonated styrene, vinyl sulfonate, isopropyl ester of acrylic acid, itaconic acid and mixtures thereof.

8. The method of claim 7 wherein;

the polymers of a above are chosen from homopolymers of acrylic acid, methacrylic acid, and maleic anhydride, and from copolymers of acrylic acid with at least one of the monomers chosen from the group consisting of methacrylic acid, maleic anhydride, acrylamide, methacrylamide, hydroxypropyl acrylates, N-t-butyl acrylamide, sulfonated styrene, vinyl sulfonate, and itaconic acid; and the polymers of b further comprise about 0.0 to about 30 mole percent of at least one of the monomers chosen from the group consisting of acrylamide and methacrylamide; and further wherein the ratio of the two polymers ranges from 5:1 to about 1.5.

9. The method of claim 8 further comprising the step of adding other corrosion inhibitors selected from the group consisting of orthophosphate, 1-Hydroxyethylidene bisophosphonic acid, 1,2,4-tri-carboxy-2-phosphono-butane, tolyltriazole, zinc salts, chromate salts, nitrite/nitrate salts, and polyphosphate.

10. The method of claim 6 wherein the water soluble polymer b further comprises from about 0.0 to about 30 mole percent of a monomer selected from the group consisting of acrylamide, methacrylamide, and mixtures thereof.

11. The method of claim 10 wherein the combination of a and b polymers are added to hard waters so as to provide from 1–50 ppm of b polymers, based on hard waters treated.

* * * * *